United States Patent
Dong et al.

(10) Patent No.: US 9,284,412 B2
(45) Date of Patent: *Mar. 15, 2016

(54) ORGANICALLY MODIFIED HYBRID AEROGELS

(71) Applicant: ASPEN AEROGELS, INC., Northborough, MA (US)

(72) Inventors: Wenting Dong, Marlborough, MA (US); Wendell E Rhine, Belmont, MA (US); Decio Coutinho, Marlborough, MA (US)

(73) Assignee: Aspen Aerogel, Inc., Northborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,885

(22) Filed: Jun. 1, 2015

(65) Prior Publication Data

US 2015/0259476 A1 Sep. 17, 2015

Related U.S. Application Data

(63) Continuation of application No. 14/508,740, filed on Oct. 7, 2014, now Pat. No. 9,085,893, which is a continuation of application No. 13/299,677, filed on Nov. 18, 2011, now Pat. No. 8,952,119.

(60) Provisional application No. 61/415,329, filed on Nov. 18, 2010.

(51) Int. Cl.
| | |
|---|---|
| *C08G 73/10* | (2006.01) |
| *B01J 13/00* | (2006.01) |
| *C08G 77/54* | (2006.01) |
| *C08K 3/20* | (2006.01) |
| *F16L 59/02* | (2006.01) |
| *E04B 1/78* | (2006.01) |

(52) U.S. Cl.
CPC ............ *C08G 73/106* (2013.01); *B01J 13/0091* (2013.01); *C08G 77/54* (2013.01); *C08K 3/20* (2013.01); *E04B 1/78* (2013.01); *F16L 59/028* (2013.01); *C08G 2220/00* (2013.01)

(58) Field of Classification Search
None
See application file for complete search history.

(56) References Cited

U.S. PATENT DOCUMENTS

| | | | | |
|---|---|---|---|---|
| 4,818,806 | A * | 4/1989 | Kunimune et al. | 528/26 |
| 5,036,145 | A * | 7/1991 | Echterling et al. | 525/431 |
| 5,962,113 | A * | 10/1999 | Brown et al. | 428/209 |
| 6,011,123 | A * | 1/2000 | Kurosawa et al. | 525/431 |
| 7,732,496 | B1 * | 6/2010 | Leventis et al. | 516/99 |
| 8,067,478 | B1 * | 11/2011 | Meador et al. | 521/154 |
| 2004/0087670 | A1 * | 5/2004 | Lee et al. | 516/99 |
| 2004/0110014 | A1 * | 6/2004 | Chen et al. | 428/447 |
| 2004/0132845 | A1 * | 7/2004 | Rhine et al. | 521/82 |
| 2005/0192367 | A1 * | 9/2005 | Ou et al. | 521/64 |

OTHER PUBLICATIONS

Kandary et al. "Morphology and Thermo-Mechanical Properties of Compatibilized Polyimide-Silica Nanocomposites" J. Appl. Sci. vol. 98, 2521-2531, 2005.*

* cited by examiner

*Primary Examiner* — Robert S Loewe
(74) *Attorney, Agent, or Firm* — Mark Hanson; Poongunran Muthukumaran

(57) ABSTRACT

Disclosed and claimed herein are hybrid aerogels which are compositions of tetraalkoxysilanes and bis-(trialkoxysilyl) imides that exhibit low thermal conductivities and high compressive strengths. Methods for their preparation are also provided.

20 Claims, 3 Drawing Sheets

$$H_2N\text{-}R\text{-}Si\text{-}(OR')_3$$

ORGANICALLY MODIFIED HYBRID AEROGELS

REFERENCE TO PRIOR FILED APPLICATIONS

This application is a continuation of U.S. patent application Ser. No. 14/508,740 filed Oct. 7, 2014; which is a continuation of U.S. patent application Ser. No. 13/299,677 filed Nov. 18, 2011; which claims the benefit of U.S. Provisional Application 61/415,329 filed Nov. 18, 2010 under 35 U.S.C. §119(e); which applications are incorporated by reference herein in their entirety.

STATEMENT OF GOVERNMENT SUPPORT

The subject matter of the present application was made with Government support from the National Aeronautics and Space Administration under Contract No. NNX09CE82P and Contract No. NNX10CB23C. The Government may have certain rights to the subject matter of the present application.

FIELD OF THE INVENTION

The present application for patent is in the field of hybrid aerogels and more specifically in the field of silicon containing aerogels prepared from compositions of tetraalkoxysilanes and bis-(trialkoxysilane) diimide functionalities. Methods for their preparation are also provided.

BACKGROUND

There are many areas in which materials that provide thermal insulation are required. The exploration of space requires new technologies for long term cryogenic propellant storage applications in space, on the lunar surface, and on the earth. Thermal insulating materials help to lower the energy requirements to keep a substance hot or cold. High performance thermal insulation materials are needed to insulate cryotanks at both low and high temperatures on launch vehicles as well as cryogenic fluid storage tanks Silica aerogels are the best known thermal insulating materials available. However, the mechanical strength of these aerogels needs to be improved to meet the requirements of these applications. Improvements in the strength of aerogels would allow these materials to be used as advanced non-compacting insulation materials capable of retaining structural integrity while accommodating larger operating temperatures ranging from cryogenic to elevated temperatures.

Silica containing aerogels crosslinked with trialkoxysilyl terminated organic compounds have been disclosed; see, for example, US Patent Application No. 2006/0286360 to Rhine et al. The mechanical strength of aerogel materials can be increased by reinforcing them with organic crosslinking agents. For example, polyimide materials have excellent thermal, mechanical and electronic properties compared to other organic polymeric materials, due to the highly rigid molecular structures. U.S. Pat. No. 7,074,880 to Rhine et al. discloses polymeric imides to which poly(dimethylsiloxane) has been attached and U.S. Pat. No. 7,074,880 to Rhine et al. discloses polyimides which are modified with silica, alumina and the like. In these disclosures, a majority of the materials are organic in nature. As such they deviate significantly from silica based aerogels. Also, it is not clear what properties a polyimide-silica composite would have in terms of its mechanical strength in combination with its thermal insulating properties.

Bis-trialkoxysilane diimide materials have been as an additive in polyimide coatings to improve their thermal and mechanical properties. Incompatibility issues control the types and amounts of silane material that can be used. These materials and coatings made therefrom are readily distinguishable from aerogels. Aerogels describe a class of material based upon their structure, namely low density, open cell structures, large surface areas (often 900 $m^2/g$ or higher) and sub-nanometer scale pore sizes. Supercritical and subcritical fluid extraction technologies are commonly used to extract the fluid from the fragile cells of the material. A variety of different aerogel compositions are known and they may be inorganic, organic and inorganic/organic hybrid (see N. Husing and U Schubert, Angew. Chem. Int. Ed. 1998, 37, 22-45). Inorganic aerogels are generally based upon metal alkoxides and include materials such as silica, carbides, and alumina. Organic aerogels include, but are not limited to, urethane aerogels, resorcinol formaldehyde aerogels, and polyimide aerogels. Organic/inorganic hybrid aerogel were mainly organically modified silicate. The organic components are covalently bonded to the silica network. In other words, the organic and inorganic phases are chemically bonded to each other in the inorganic/organic hybrid aerogels.

The strength of aerogels such as those based on polyimide can be increased by crosslinking the polyimides with triamines and alkoxysilanes, however the thermal conductivity properties suffer.

Therefore, there remains a need for light-weight silica aerogels which incorporate the excellent thermal conductivity properties of silica aerogels while incorporating the mechanical strength provided by organic crosslinking materials.

DETAILED DESCRIPTION OF THE DISCLOSURE

Figure 1:
FIG. 1 illustrates a primary amine terminated trialkoxysilane useful in the present invention

This disclosure introduces a solution to the problem of combining high mechanical strength and low thermal conductivity of silicon-based aerogel by incorporating diimide crosslinking agents into the silica aerogel. It has surprisingly been found that addition of selected amounts of bis-(trialkoxysilane) diimides to silica aerogel precursors provide for hybrid aerogels that have low thermal conductivity, but have mechanical strength that is greater than silica aerogels prepared without the diimide additive. Additionally, it has been found that preparing these hybrid aerogels with selected amounts of water (based on water/silica ratios as defined below) provide for hybrid aerogels with selected density, thermal conductivity and mechanical strength. It was also found that thermal conductivity properties of the hybrid aerogels differ greatly from different aging conditions.

As used herein, the conjunction "and" is intended to be inclusive and the conjunction "or" is not intended to be exclusive unless otherwise indicated. For example, the phrase "or, alternatively" is intended to be exclusive.

The use of the terms "a" and "an" and "the" and similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

In a first embodiment, disclosed and claimed herein are hybrid aerogels composed of the reaction products of tetraalkoxysilanes, bis-(trialkoxysilane)-diimides and a selected amount of water.

In a second embodiment, disclosed and claimed herein are hybrid aerogels composed of the reaction products of tetraalkoxysilanes, bis-(trialkoxysilane)-diimides and a selected amount of water, wherein the amount of water is calculated from water to silica ratios of 8-20.

In a third embodiment, disclosed and claimed herein are hybrid aerogels composed of the reaction product of tetraalkoxysilanes, bis-(trialkoxysilane)-diimides and a selected amount of water wherein the at least one tetraalkoxysilane is partially hydrolyzed tetraalkoxysilanes.

In a fourth embodiment, disclosed and claimed herein are hybrid aerogels composed of the reaction products of tetraalkoxysilanes, bis-(trialkoxysilane)-diimides, and a selected amount of water, wherein the at least one tetraalkoxysilane is partially hydrolyzed tetraalkoxysilanes, and wherein the amount of water is calculated from water to silica ratios of 8-20.

In the aforementioned embodiments, the disclosed and claimed crosslinked aerogels have at least one of a final density less than about 0.7 grams/cubic centimeter, a thermal conductivity of less than about 30 mW/m-K, or a compressive modulus greater than about 175 pounds/square inch.

In a further embodiment, disclosed and claimed herein are methods of preparing hybrid aerogels containing the steps of combining at least one tetraalkoxysilanes, or optionally at least one partially hydrolyzed tetraalkoxysilane, at least one bis-(trialkoxysilane)-diimide and a selected amount of water, admixing a gelation catalyst to condense and gel the siloxanes; and drying the gel to obtain a hybrid aerogel.

In still a further embodiment, disclosed and claimed herein are methods of preparing hybrid aerogels containing the steps of combining at least one tetraalkoxysilanes, or optionally at least one partially hydrolyzed tetraalkoxysilane, at least one bis-(trialkoxysilane)-diimide and a selected amount of water, admixing a gelation catalyst to condense and gel the mixture (or sol); and drying the gel to obtain a hybrid aerogel wherein the hybrid aerogels have at least one of a final density less than about 0.7 grams/cubic centimeter, a thermal conductivity of about 30 milliwatts/meter-degree Kelvin or below, or a compressive modulus greater than about 175 pounds/square inch.

The instant application for patent provides for hybrid aerogels containing the reaction products of tetraalkoxysilanes, trialkoxysilanes that are crosslinked by at least one diimide and a selective amount of water as well as methods for preparing them.

The tetraalkoxysilanes, $(RO)_4Si$, useful in the present application are any silanes which are capable of being hydrolyzed by water or water with acidic or basic water, such as, for example, tetraethoxysilane (TEOS), tetramethoxysilane and tetrapropoxysilanes.

Figure 2:
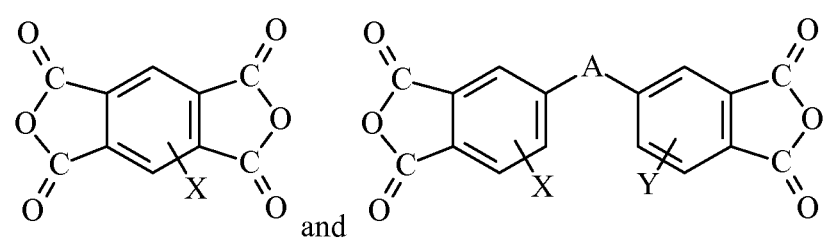
FIG. 2 illustrates dicarboxylic anhydrides useful in the present invention

The bis-(trialkoxysilane)-diimides are the reaction product of a primary amine terminated trialkoxysilane, FIG. 1, and a dicarboxylic anhydride represented by $O_3C_2$—R"—$C_2O_3$, wherein R can be, for example, alkyl, alkenyl, alkynyl, cycloalkyl, cycloalkenyl, aryl, aralkyl, heterocyclic, or other hydrocarbon and can contain heteroatoms such as O, S, N, P, and Se, and R' can be any hydrolysable C1-C21 branched or unbranched alkyl group. R" represents a difunctional aliphatic group, a difunctional aromatic group or a difunctional heteroaromatic group, wherein any of the groups may be substituted or unsubstituted. Examples of dianhydrides useful in the current disclosure are shown in FIG. 2 as well as 3,3',4,4'-benzophenone tetracarboxylic dianhydride and 2,3,6,7-naphthalene tetracarboxylic anhydride.

Note that for the current disclosure the primary amine terminated siloxane or dianhydride is not limited to those compounds listed.

The amine terminated trialkoxysilane is reacted with a dianhydride to form a bis-trialkoxysilane-diimide. An example of the reaction is shown in FIG. 3.

Figure 3:
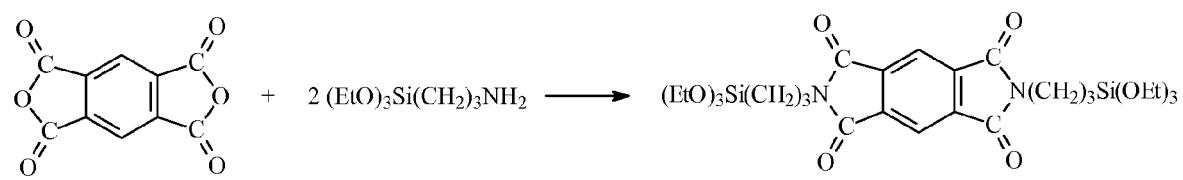
FIG. 3 illustrates an example reaction of silanes and dianhydrides to form a bis-trialkoxysilane diimide

Referring to FIG. 3 as a suitable example, pyromellitic dianhydride (PMDA) and 3-triethoxysilylpropylamine (APTES) were admixed in dimethylacetamide (DMAc) solvent. Other solvents, such as, for example dimethylformamide or N-methyl-2-pyrrolidone (NMP) could be used provided they solubilize the dianhydride and the silane and do not interfere with the imidization process. The mixture was stirred for a suitable period of time 0.5-48 hours. The temperature of mixing could range from room temperature to the boiling point of the solvent. Imidization was achieved by either thermal imidization using high temperature refluxing or chemical imidization using an imidization catalyst added during the mixing time period. Suitable catalysts include tertiary amines such as, for example, triethylamine or aromatic amines such as for example pyridine. The solution was then refluxed for a short period of time or heated at a mild temperature for a longer period of time to substantially form the diimide.

One of the by-products of the imidization process is water, which will tend to hydrolyze the silane under the refluxing conditions. To prepare aerogels using 100% diimide, the diimide is further hydrolyzed using techniques known in the art to hydrolyse trialkoxysilanes, for example, water was added to further hydrolyze the silane to form silanols, —Si—OH. The silanols are then condensed to form silica groups, —Si—O—Si—, and subsequently gels. The aerogels are crosslinked via the diimide groups. A condensation catalyst may also be added during the condensation reaction, such as, for example, aqueous ammonia.

One of the by-products of the imidization process is water, which will tend to hydrolyze the silane under the refluxing or mild heating conditions. To prepare aerogels using 100% diimide, the silanols on the hydrolyzed diimide is condensed upon heating to form silica groups, —Si—O—Si—, and subsequently gels. The aerogels are crosslinked via the diimide groups. A condensation catalyst may also be added during the condensation reaction, such as, for example, aqueous ammonia, for example containing 70% of water and therefore can further hydrolyzed the triethoxysilane and further condense the silanol groups to form gels.

The diimides may be hydrolysed and condensed alone or in combination with tetraalkoxysilanes, such as, for example, tetraethoxysilane (TEOS). The addition of TEOS provides for less crosslinking by the diimide moieties and higher concentrations of silica gel. Pre-hydrolyzed TEOS, such as Silbond H5 (SBH5) from Silbond Corp, which is hydrolyzed with a water/silica ratio of about 1.5, may also be use as received or may be further hydrolysed prior to addition into the reaction. The further hydrolysis is performed by adding an additional water to achieve a water/silica ratio of about 4 and mixing for a desired period of time. The particular type and amount of pure silica gel selected provides for a narrow dispersity of silica polymer with slightly smaller molecular weight species.

The present disclosure combines tetraalkoxysilanes or partially pre-hydrolyzed trialkoxysilane and at least one of the diimides described supra with the addition of sufficient water to reach a selected water to silica ratio as described below.

The hydrolyzed silane composition is then aged at temperatures ranging from 50 to 250° C. for a period of time from 1-48 hrs using amine containing materials, such as, for example, triethylamine in ethanol or aqueous ammonia in ethanol. The gels then undergo a solvent exchange wherein they are washed several times to substantially replace the reaction solvent, for example, with ethanol.

Numerous drying methods have been explored for drying aerogels. U.S. Pat. No. 6,670,402 teaches drying via rapid solvent exchange of solvent(s) inside wet gels using supercritical $CO_2$ by injecting supercritical, rather than liquid, $CO_2$ into an extractor that has been pre-heated and pre-pressurized to substantially supercritical conditions or above to produce aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses processes for producing gel compositions comprising: drying a wet gel comprising gel solids and a drying agent to remove the drying agent under drying conditions sufficient to minimize shrinkage of the gel during drying. U.S. Pat. No. 5,565,142 describes subcritical drying techniques herein incorporated by reference as it relates to supercritical drying. The embodiments of the present disclosure may be practiced with drying using any of the above techniques. In some embodiments, the drying is performed at vacuum to below supercritical pressures (pressures below the critical pressure of the fluid present in the gel at some point) and optionally using surface modifying agents.

One example of drying the hybrid aerogel at supercritical conditions of $CO_2$ includes for example, first substantially exchanging the solvent present in the porosity of the gels by liquid $CO_2$ and in the second step heating the autoclave beyond the critical temperature of $CO_2$ which is 31.06° C. and increasing a pressure to a pressure greater than about 1070 psig. In an alternative way, the drying of aerogels is carried out directly by heating the autoclave beyond the critical temperature of $CO_2$. The system is kept at these conditions for at least an hour to be sure that all $CO_2$ is at its hypercritical conditions and to ensure that essentially all the solvent have been removed from the gel. After that, the autoclave is depressurized slowly to atmospheric pressure.

The amount of water used in the hydrolysis and gelation reactions was varied in the embodiments of the present disclosure. Total water was calculated by adding all the water added to the reaction including water from aqueous ammonia and also the water produced during the synthesis of diimide starting material as well as the water that is created during the condensation reactions of the silanols intermediates. The total silica is the sum of silica from the diimide starting material and from any other silica source such as, for example, TEOS or SBH5. Total water to silica ratio is the molar ratio of total water to total silica and could range from about 1 to about 20. The particular ratio selected depended on the desired final properties of the aerogel, such as, for example, thermal conductivity, mechanical strength and final density.

The target density is the density of the aerogel expected assuming that no shrinkage occurs during aging and drying of the gel. The target density was calculated by the ratio of the theoretical weight of the solids in the aerogel to the volume of the sol before gelation and is the grams of solid in solution per mL.

The hybrid aerogels of the present disclosure can be with a fibrous material, such as, for example, microfibers, mats, felts, woven fabrics, non-woven fabrics, fibrous battings, lofty battings and combinations thereof. The hybrid aerogel composites reinforced with a fibrous batting, herein referred to as "blankets", are particularly useful for applications requiring flexibility since they are highly conformable and do not significantly alter the thermal conductivity. Aerogel blankets and similar fiber-reinforced aerogel composites are described in published US patent application 2002/0094426A1 and U.S. Pat. Nos. 6,068,882; 5,789,075; 5,306,555; 6,887,563 and 6,080,475 all hereby incorporated by reference as they relate to fibrous aerogels and blankets.

EXAMPLES

Preparation of Mixed Solvent.

The mixed solvent was prepared by mixing DMAc and ethanol in 1:1 volume ratio and mixed well before use.

Preparation of
bis-3-trialkoxysilylpropyl-pyromellitic diimide A 4.98 g of pyromellitic anhydride was dissolved in 89.3 mL of dimethylacetamide (DMAc). To this solution was added 10.11 g of 3-aminopropyl-triethoxysilane and stirred for 30 minutes at room temperature. Then this mixture was refluxed at 230° C. for 1.25 hours. It was used further without isolation.

Preparation of
bis-3-trialkoxysilylpropyl-pyromellitic diimide B
Precursor

Diimide B precursor was prepared similarly to diimide A except that the mixing was performed at room temperature for 4.5 hours. It was used further without isolation. This precursor can be chemical imidized using triethylamine (TEA) after dilution with mixed solvent at desired target density.

Preparation of
bis-3-trialkoxysilylpropyl-pyromellitic diimide C

Diimide C was prepared similarly to diimide B except the chemical imidizations were done before dilution to the desired target density. 4.98 g of pyromellitic anhydride was dissolved in 80.3 mL of dimethylacetamide (DMAc). To this solution was added 10.11 g of 3-aminopropyl-triethoxysilane and stirred for 60 minutes at room temperature. To this solution, 6.68 mL triethylamine (TEA) was added while stirring and the mixture was heated to 60° C. for 15.5 hours. It was used further without isolation.

Preparation of TEOS Sol

To 48.6 mL tetraethoxysilane (TEOS) was added 51.4 mL of a mixture of 44.1 mL ethanol, 7.2 mL water and 0.204 g a mineral acid (e.g., hydrochloric, sulfuric, phosphoric) and stirred at room temperature for 28 hours.

Preparation of Further Hydrolyzed Silbond H-5 (SBH5)

To 100 mL of SBH5 was added 14 mL ethanol and 14 mL water and stirred at room temperature for a minimum of 2 hours.

Preparation of Aerogel 1

25 mL of diimide A was dissolved in DMAc and poured into a plastic mold with a sealable lid and placed in an oven set at 60° C. to form a gel. After gelation, 38 mL of 10% triethylamine (TEA) in ethanol was added and then the sealed container was placed in an oven set at 60° C. to age the gel. The resulting gel was washed 2 times with 38 mL of ethanol. The gel was dried using supercritical $CO_2$ drying in 1 day.

Preparation of Aerogel 2 and Aerogel 3

To 27.5 mL of diimide B precursor solution was added 56 mL of mixed solvent and stirred for 10 minutes. To this solution, 16.8 mL of a solution containing 3.1 mL triethylamine (TEA) in 13.7 mL mixed solvent was added. 50 mL of the resulting composition was poured into two separate containers which were placed in an oven set at 60° C. for 16 hours. Then to each container was added 1.6 mL condensation catalyst using $NH_4OH$ aqueous solution (30% aqueous ammonia) for gelation at 60° C. The water/silica ratio was 10.8. To the Aerogel 2 was added 75 mL of 2% ammonia in ethanol and to the Aerogel 3 was added 75 mL of 10% TEA in ethanol and the sealed containers were placed in an oven set at 60° C. to age the gels. The resulting gels were washed 2 times with 75 mL of ethanol. The gels were dried using supercritical $CO_2$ in 1 day.

Preparation of Aerogels 4-13.

Aerogels 4-13 were prepared similarly to Aerogel 3 except various amounts of mixed solvent were used to dilute Diimide B precursor to reach different target densities and also various amounts of aqueous ammonia were added as a condensation catalyst to the diluted diimide B precursor to form gels. The water/silica ratio varied from 1-11 depending on the ammonia catalyst concentration in gelation as shown in Table 1. Also 10% triethylamine in ethanol was used to age the gel.

In Table 1 the Compressive Modulus and Compressive Strength were determined using an Instron mechanical tester. The Thermal Conductivity was determined using calibrated hot plate devices that were made by Aspen Aerogels. The calibrated hot plate (CHP) devices were used to measure thermal conductivity of small, flat aerogel samples at room temperature. The CHP method is based on the principle underlying ASTM E 1225, *Standard Test Method for Thermal Conductivity of Solids by Means of the Guarded-Comparative-Longitudinal Heat Flow Technique*. The Final Densities were determined by the ratio of mass of the aerogel to the volume of the aerogel. Average Radial Shrinkage was determined as the percentage of the diameter difference between the aerogel monolith (cylindrical shape) and mold (cylindrical shape) divided by the mold diameter.

TABLE 1

Aerogels using only diimide A or B and varying the amount of condensation catalyst and target density

| Hybrid Aerogel | Target density (g/cc) | $NH_4OH$ conc. (vol %) Gel catalyst | Diimide formation reaction temp. (° C.) | Aging additive | Comp. Modulus (psi) | Comp. Strength (psi) | Thermal Conductivity (mW/M · K) | Final density (g/cc) |
|---|---|---|---|---|---|---|---|---|
| 1 | 0.10 | 0 | 230 | 10% TEA | 15,001 | 1300 | 36.3 | 0.645 |
| 2 | 0.027 | 3.2 | 25 | 2% $NH_4OH$ | 408 | 50 | 16.2 | 0.159 |
| 3 | 0.027 | 3.2 | 25 | 10% TEA | 1212 | 100 | 15.9 | 0.246 |
| 4 | 0.03 | 0.4 | 25 | 10% TEA | NA | NA | 18.8 | 0.268 |
| 5 | 0.05 | 2.9 | 25 | 10% TEA | 871 | 55 | 24.8 | 0.216 |
| 6 | 0.05 | 1.2 | 25 | 10% TEA | NA | NA | 27.9 | 0.344 |
| 7 | 0.05 | 2.0 | 25 | 10% TEA | 3558 | 180 | 26.9 | 0.339 |
| 8 | 0.07 | 6* | 25 | 10% TEA | 7889 | 400 | 30.1 | 0.394 |
| 9 | 0.07 | 4 | 25 | 10% TEA | 13195 | 1000 | 37.6 | 0.544 |
| 10 | 0.07 | 6 | 25 | 10% TEA | 22714 | 1300 | 35.0 | 0.590 |
| 11 | 0.09 | 4 | 25 | 10% TEA | 24929 | 1500 | 49.2 | 0.645 |
| 12 | 0.09 | 6 | 25 | 10% TEA | 18785 | 1400 | 63.1 | 0.634 |
| 13 | 0.09 | 8 | 25 | 10% TEA | 8243 | 1100 | 39.5 | 0.568 |

*6% NH4OH was added in increments: $1^{st}$ with 2.4%, then after 1 hour, 3.6%

As can be seen from the Table 1, aerogels created from 100% diimides provide for materials with final densities range from 0.16-0.65 g/cc. The Thermal Conductivity increases with increased final density of the aerogels. Thus the lowest Thermal Conductivity was achieved at a Final Density of 0.159 g/cc. The compressive moduli also increase as the final density increases. The density of the aerogels was very high for the gels aged in 10% TEA, and therefore, these aerogels had high compressive moduli and strengths. The highest compressive modulus of approx. 25000 psi was obtained when the Final Density was 0.65 g/cc. The thermal conductivities of these imide crosslinked aerogels are exceptionally low for porous materials with such high densities and strengths. The goal of preparing a non-compacting insulation material with a thermal conductivity less than 28 mW/m-K and a strength greater than 100 psi could be achieved with the silylimide aerogels that have a density between 0.246 and 0.334 g/cc.

Preparation of Aerogels 14-27.

Aerogels 14-25 were prepared with varying amounts of diimide C and SBH5 as shown in Table 2.

In the preparation of aerogels with 0%, 10% and 25% diimide, as shown in Table 2:

47.1 mL, 45.9 mL, and 44.0 mL of mixed solvent was added to 21.51 mL, 19.35 mL, and 16.13 ml of SBH5, respectively, followed by the addition of 0 mL, 4.2 mL, and 10.5 mL of diimide C and then stirred for 10 minutes. To these sol mixtures, 31.4 mL, 30.6 mL and 29.3 mL of catalyst solution containing various amounts of aqueous ammonia (70% water) and mixed solvent was added, respectively, to give a water/silica ratio as shown in Table 2. Then the sols were stirred for approximately 10 minutes at room temperature and 50 mL of each sol was poured, individually, into its own plastic container and set at room temperature to form a gel. To each gel was added 75 mL of aging fluid containing 1.1% ammonia, 4.0% hexamethyldisilazane and 1.5% TEA in ethanol and aged at 60° C. The resulting gels were washed 6 times with 75 mL of ethanol. The gel was dried using supercritical $CO_2$ in 1 day.

Aerogels 26 and 27 were prepared with varying amount of diimide C and further hydrolyzed SBH5, shown in Table 2:

42.6 and 41.3 mL of mixed solvent was added to 24.8 mL and 20.7 mL of further hydrolyzed SBH5, respectively, followed by the addition of 4.2 mL and 10.5 mL of diimide C and stirred for 10 minutes. To these two sol mixtures, catalyst solutions containing various aqueous ammonia (with 70% water) was added, respectively, to give a water/silica ratio of 20 and 16.

Aerogels 36-39 serve as examples in this preparation: to 11.4 mL, 18.9 mL, 26.5 mL, and 34 mL of TEOS sol was add 59.2 mL, 44.9 mL, 30.8 mL and 16.4 mL of mixed solvent, respectively, followed by the addition of 15 mL, 25 mL, 35 mL and 45 ml of diimide B, as shown in Table 2. To these sol mixtures was added 14.7 mL, 11.2 mL, 7.7 mL, and 4.2 mL gelation catalyst containing 4.2 mL, 3.0 mL, 1.8 mL and 1.80 mL aqueous ammonia in mixed solvent, respectively, and stirred for 10 minutes. 50 mL of each individual sol was poured into its own container and each was placed in an oven set at 60° C. to form gels. Most samples gelled within one hour. To each gel was added 75 mL of 10% TEA in ethanol and placed in an oven set at 60° C. to age the gel. The resulting gel was washed 2 times with 75 mL of ethanol. The gel was dried using supercritical $CO_2$ in 1 day.

TABLE 2

Hybrid aerogels varying the amount of diimide and water/silica ratio. Target density for all Hybrid Aerogels was 0.042 g/cc.

| Hybrid Aerogel | Diimide Content (wt %) | Concentration of aqueous ammonia in total volume of sol (vol. %) | Total water/silica ratio | Average Final Density (g/cc) | Average Radial Shrinkage (%) | Average Thermal Conductivity (nW/m · K) |
|---|---|---|---|---|---|---|
| 14 | 0 | 0.22 | 8 | 0.087 | 17.46 | 17.45 |
| 15 | 0 | 0.36 | 12 | 0.099 | 16.47 | 15.20 |
| 16 | 0 | 0.50 | 16 | 0.102 | 17.46 | 18.00 |
| 17 | 0 | 0.6 | 20 | 0.100 | 15.67 | 15.85 |
| 18 | 10 | 0.53 | 8 | 0.144 | 27.38 | 16.95 |
| 19 | 10 | 0.84 | 12 | 0.137 | 26.19 | 12.45 |
| 20 | 10 | 1.16 | 16 | 0.126 | 23.81 | 11.90 |
| 21 | 10 | 1.46 | 20 | 0.109 | 21.03 | 12.95 |
| 22 | 25 | 0.99 | 8 | 0.162 | 28.97 | 12.80 |
| 23 | 25 | 1.56 | 12 | 0.152 | 28.57 | 12.75 |
| 24 | 25 | 2.13 | 16 | 0.119 | 21.43 | 12.30 |
| 25 | 25 | 2.70 | 20 | 0.100 | 19.44 | 11.65 |
| 26* | 10 | 1.38 | 20 | 0.081 | 12.50 | 13.25 |
| 27* | 25 | 2.07 | 16 | 0.108 | 19.05 | 11.10 |

*Hybrid aerogel 26 and 27 substituted further hydrolyzed SBH5 for SBH5 as received.

As can be seen in Table 2, the pure silica aerogels 14-17 have thermal conductivities in the range of 15-18 mW/m-K and final densities are 0.09-0.10 g/cc. It has surprisingly been found that the hybrid aerogels have lower thermal conductivities than the pure silica aerogels. Increases in the amount of water used in comparison to the amount of silica precursor used ($H_2O$/Si ratio) led to less shrinkage. Therefore the Average Final Density of the hybrid aerogels decreases with increasing total $H_2O$/Si ratio. The thermal conductivities of these samples were between 11 and 14 mW/m-K for the aerogels with final densities in the range of 0.10-0.16 g/cc, which were prepared with total $H_2O$/Si ratios in the range of 12-20. Comparing hybrid aerogel 27 with hybrid aerogel 24 and hybrid aerogel 26 with hybrid aerogel 21, it can be seen that the further hydrolyzed SBH5 resulted in hybrid aerogels with deceased densities, but the thermal conductivities were not lowered significantly.

Preparation of Aerogels 28-42.

These aerogels were prepared with varying amounts of diimide B and hydrolyzed tetraethoxysilane (TEOS) sol used in place of the SBH5 sol as well as varying the Target Density and ammonia concentration, as shown in Table 3.

TABLE 3

Hybrid aerogels varying the amount of diimide and target density, using hydrolyzed TEOS in place of SBH5.

| Hybrid Aerogel | Target Density (g/cc) | Diimide (wt %) | $NH_4OH$ concentration (vol %) | Average Final Density (g/cc) | Average Radial Shrinkage (%) | Average Thermal Conductivity (mW/m · K) |
|---|---|---|---|---|---|---|
| 28 | 0.03 | 10 | 4.2 | 0.156 | 35.91 | 18.70 |
| 29 | 0.05 | 10 | 3 | 0.225 | 35.20 | 21.90 |
| 30 | 0.07 | 10 | 1.8 | 0.329 | 38.49 | 33.20 |
| 31 | 0.09 | 10 | 1.8 | Broken | 34.92 | 32.10 |
| 32 | 0.03 | 25 | 4.2 | Broken | 28.97 | 19.50 |
| 33 | 0.05 | 25 | 3 | 0.206 | 33.13 | 19.30 |
| 34 | 0.07 | 25 | 1.8 | 0.310 | 34.13 | 24.65 |
| 35 | 0.09 | 25 | 1.8 | 0.402 | 34.92 | 31.20 |
| 36 | 0.03 | 50 | 4.2 | Broken | 34.52 | 19.60 |
| 37 | 0.05 | 50 | 3 | 0.170 | 28.44 | 20.93 |
| 38 | 0.07 | 50 | 1.8 | 0.318 | 33.33 | 25.70 |
| 39 | 0.09 | 50 | 1.8 | 0.432 | 37.30 | 32.40 |
| 40 | 0.05 | 75 | 3 | 0.137 | 25.40 | 25.75 |
| 41 | 0.07 | 75 | 1.8 | 0.327 | 36.31 | 27.90 |
| 42 | 0.09 | 75 | 1.8 | 0.429 | 38.69 | 36.75 |

As can be seen from Table 3 the thermal conductivities prepared using TEOS silica sol and diimide content of 10 and 75% are 18.70 mW/m-K and 26 mW/m-K, respectively.

Table 4 shows the Mechanical Strength of some selected Hybrid Aerogels. The Strength was determined using the standard techniques of stress-strain curve analysis. It can be seen that the Compressive Modulus of hybrid aerogel 20, despite having essentially the same density as non-hybrid aerogel 17, is three times greater indicating the effect diimides have on aerogels.

TABLE 4

Mechanical Strength of select Hybrid Aerogels compared to Non-hybrid Aerogels

| Hybrid Aerogel | SBH5 type | Diimide (wt %) | Total water/silica ratio | Average Density (g/cc) | Average Thermal Conductivity (nW/m · K) | Compressive Modulus (psi) | Strength (psi) |
|---|---|---|---|---|---|---|---|
| 17 | As received | 0 | 20 | 0.100 | 15.85 | 51.7 | 3 |
| 20 | As received | 10 | 16 | 0.126 | 11.90 | 237.1 | 16 |
| 31 | As received | 10 | 20 | 0.109 | 12.95 | 175.8 | 10 |
| 27 | Further hydrolyzed | 25 | 16 | 0.108 | 11.10 | 190.8 | 11 |

Thus hybrid aerogels of the present disclosure gives materials with low thermal conductivities and high mechanical strength.

Micro/meso porosity data were acquired on a Micromeritics ASAP 3010 Micropore Analyzer using $N_2$ gas. The samples were degasses at 100° C. in a vacuum for 18-24 hs before testing. Surface areas were calculated using Brunauer, Emmett and Teller (BET) multimolecular layer absorption model. Average pore sizes and cumulative pore volumes employed the Barrett, Jounerr and Halenda (BJH) model and were calculated from the desorption branch of the isotherms.

The surface areas and pore size distributions for PI-silica hybrid aerogels prepared using SBH5 were determined as reported in Table 5. Aerogels containing 25% APTES-PMDA increases pore volume and decrease BET surface area. The total water/silica ratio in the formulation did not change the BET surface area dramatically and pore volumes were smaller if we use high water to silica ratios. $N_2$ data for the 'as received' SBH5 and 'further hydrolyzed' SBH5 showed that 'further hydrolyzed' SBH5

TABLE 5

BET data for polyimide-silica hybrid prepared using SBH5 and different APTES- PMDA content.

| Sample ID | 17 | 21 | 24 | 25 | 26* |
|---|---|---|---|---|---|
| APTES-PMDA content (wt %) | 0 | 10 | 25 | 25 | 10 |
| Total H2O/Si ratio | 20 | 20 | 16 | 20 | 20 |
| Silbond H5 | As received | As received | As received | As received | Further hydrolyzed |
| Density (g/cc) | 0.100 | 0.109 | 0.119 | 0.100 | 0.081 |
| BET Surface Area (m2/g) | 866.5 | 878.7 | 845.1 | 841.3 | 870.4 |
| BJH Desorption Cumulative Pore Volume of pores (cm3/g) | 2.45 | 3.14 | 3.61 | 3.41 | 3.11 |
| Adsorption Average Pore Diameter (4V/A by BET) (nm) | 11.72 | 14.63 | 17.50 | 16.58 | 14.54 |
| BJH Desorption Average Pore Diameter (4V/A) (nm) | 8.21 | 10.51 | 13.50 | 12.60 | 9.68 |

Although the present disclosure has been shown and described with reference to particular examples, various changes and modifications which are obvious to persons skilled in the art to which the disclosure pertains are deemed to lie within the spirit, scope and contemplation of the subject matter set forth in the appended claims.

What is claimed is:

1. Hybrid aerogels comprising a polymeric network which comprises a silica component and diimide component, which are the reaction product of:
   (a) at least one tetraalkoxysilane which may optionally be partially hydrolyzed,
   (b) at least one bis-trialkoxysilane diimide, and
   (c) a selected amount of water;
   wherein a gelation catalyst is admixed to gel the reaction product; and wherein the gel is dried to obtain an aerogel.

2. The hybrid aerogel of claim 1, wherein the at least one bis-trialkoxysilane diimide is a reaction product of: i) a primary amine terminated trialkoxysilane according to the following formula: H2N—R—Si—(OR')3, wherein R comprises alkyl, alkenyl, alkynyl, cycloalkyl, or cycloalkenyl moities, or variations thereof which can contain at least one heteroatom comprising O, S, N, P, or Se, and R' is a C1-C21 branched or unbranched alkyl group; and ii) a dicarboxylic anhydride.

3. The hybrid aerogel of claim 2, wherein the diimide component of the polymeric network comprises a compound selected from Formula I, Formula II, or Formula III:

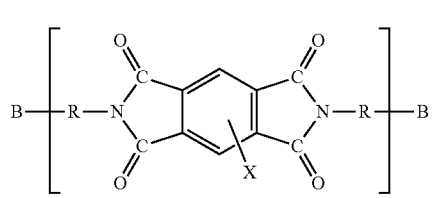

-continued

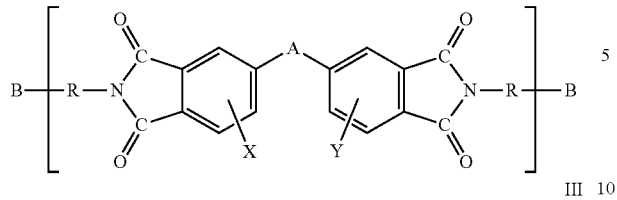

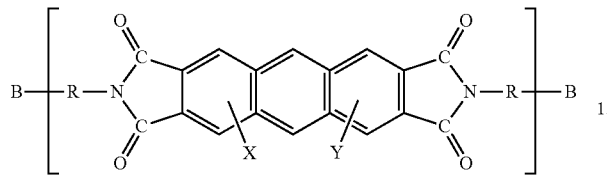

wherein R is selected from an alkyl, alkenyl, alkynyl, cycloalkyl, cycloalkenyl, aryl, aralkyl, or heterocyclic moiety, which can optionally contain one or more heteroatoms such as O, S, N, P, and Se;

A is selected from an alkyl, alkenyl, alkynyl, cycloalkyl, cycloalkenyl, aryl, aralkyl, or heterocyclic moiety, which can optionally contain a carbonyl moiety or one or more heteroatoms such as O, S, N, P, and Se;

X and Y are independently selected from a halogen, alkyl, alkenyl, alkynyl, cycloalkyl, cycloalkenyl, aryl, aralkyl, or heterocyclic moiety, which can optionally contain one or more heteroatoms such as O, S, N, P, and Se; and B is an attachment to the silica component of the polymeric network.

4. The hybrid aerogel of claim 3, wherein the diimide component of the polymeric network comprises a compound selected from Formula I; and wherein R is an alkyl moiety.

5. The hybrid aerogel of claim 4, wherein the diimide content of the aerogel is 10 wt % or less; and wherein the compressive modulus of the aerogel is greater than about 175 pounds/square inch.

6. The hybrid aerogel of claim 3, further comprising a fibrous material, comprising microfibers, mats, felts, woven fabrics, non-woven fabrics, fibrous battings, lofty battings or a combination thereof.

7. The hybrid aerogel of claim 3, wherein the hybrid aerogel has a density of 0.40 g/cc or less.

8. A hybrid aerogel comprising a polymeric network which comprises a silica component and diimide component, wherein the diimide component is covalently bonded to one or more silica molecules within the silica component of the polymeric network, wherein the hybrid aerogel has a density of 0.70 g/cc or less.

9. The hybrid aerogel of claim 8, wherein the hybrid aerogel has a density of 0.40 g/cc or less.

10. The hybrid aerogel of claim 9, wherein the diimide component of the polymeric network comprises a compound selected from Formula I, Formula II, or Formula III:

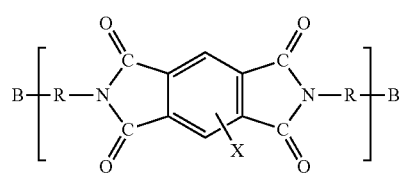

-continued

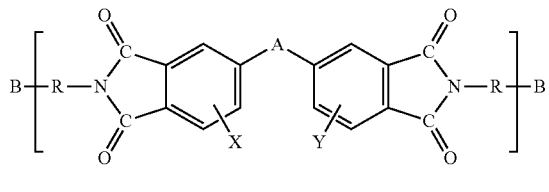

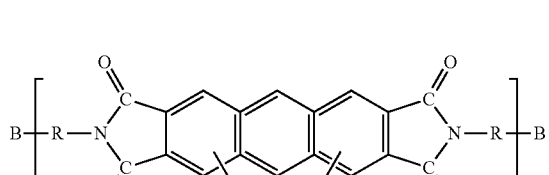

wherein R is selected from an alkyl, alkenyl, alkynyl, cycloalkyl, cycloalkenyl, aryl, aralkyl, or heterocyclic moiety, which can optionally contain one or more heteroatoms such as O, S, N, P, and Se;

A is selected from an alkyl, alkenyl, alkynyl, cycloalkyl, cycloalkenyl, aryl, aralkyl, or heterocyclic moiety, which can optionally contain a carbonyl moiety or one or more heteroatoms such as O, S, N, P, and Se;

X and Y are independently selected from a halogen, alkyl, alkenyl, alkynyl, cycloalkyl, cycloalkenyl, aryl, aralkyl, or heterocyclic moiety, which can optionally contain one or more heteroatoms such as O, S, N, P, and Se; and B is an attachment to the silica component of the polymeric network.

11. The hybrid aerogel of claim 10, wherein R is selected from an alkyl, alkenyl, alkynyl, cycloalkyl, cycloalkenyl, aryl, aralkyl, or heterocyclic moiety.

12. The hybrid aerogel of claim 11, wherein the diimide component of the polymeric network comprises a compound selected from Formula I; and wherein R is an alkyl moiety.

13. The hybrid aerogel of claim 10, wherein the thermal conductivity of the aerogel is about 30 milliwatts/meter-degree Kelvin or less.

14. The hybrid aerogel of claim 10, wherein the diimide content of the aerogel is 25 wt % or less.

15. The hybrid aerogel of claim 14, wherein the compressive modulus of the aerogel is greater than about 175 pounds/square inch.

16. The hybrid aerogel of claim 10, wherein the diimide content of the aerogel is 10 wt % or less.

17. The hybrid aerogel of claim 16, wherein the compressive modulus of the aerogel is greater than about 175 pounds/square inch.

18. The hybrid aerogel of claim 10, further comprising a fibrous material, comprising microfibers, mats, felts, woven fabrics, non-woven fabrics, fibrous battings, lofty battings or a combination thereof.

19. The hybrid aerogel of claim 10, wherein the hybrid aerogel is a reaction product of: (a) at least one tetraalkoxysilane which may optionally be partially hydrolyzed; and (b) at least one bis-trialkoxysilane diimide.

20. The hybrid aerogel of claim 19, wherein the at least one bis-trialkoxysilane diimide is a reaction product of: i) a primary amine terminated trialkoxysilane according to the following formula: $H_2N-R-Si-(OR')_3$; wherein R is selected from an alkyl, alkenyl, alkynyl, cycloalkyl, cycloalkenyl, aryl, aralkyl, or heterocyclic moiety, which can optionally contain one or more heteroatoms such as O, S, N, P, and Se; and R' is a C1-C21 branched or unbranched alkyl group; and ii) a dicarboxylic anhydride.

* * * * *